United States Patent [19]

Deck et al.

[11] 4,287,924
[45] Sep. 8, 1981

[54] SAFETY TIRE WITH SIDEWALL SUPPORT MEMBERS HAVING TWO PARTS WITH DIFFERENT FLEXIBILITIES

[75] Inventors: Alphonse Deck, Meudon; Claude Lefaucheur, Paris, both of France

[73] Assignee: Pneumatiques, Caoutchouc Manufacture et Plastiques, Kleber-Colombes, France

[21] Appl. No.: 37,889

[22] Filed: May 10, 1979

[30] Foreign Application Priority Data

May 10, 1978 [FR] France .................. 78 13891

[51] Int. Cl.³ .................. B60C 17/00; B60C 15/00; B60C 9/08
[52] U.S. Cl. .................. 152/153; 152/330 RF; 152/330 C; 152/353 R; 152/354 R; 152/357 R; 152/359; 152/374
[58] Field of Search .................. 152/151–153, 152/155, 165, 300, 301, 313–314, 352 R, 352 A, 353 R, 353 C, 353 G, 354 R, 354 RB, 355, 357 R, 357 A, 359, 360, 374

[56] References Cited

U.S. PATENT DOCUMENTS

| | | | |
|---|---|---|---|
| 3,865,169 | 2/1975 | Tsuruta | 152/330 C |
| 3,911,987 | 10/1975 | Takusagawa et al. | 152/330 RF X |
| 3,935,892 | 2/1976 | Arimura et al. | 152/330 RF |
| 3,954,131 | 5/1976 | Hoshino et al. | 152/374 X |
| 3,994,329 | 11/1976 | Masson et al. | 152/330 RF X |
| 4,067,374 | 1/1978 | Alden et al. | 152/330 RF X |

Primary Examiner—John T. Goolkasian
Assistant Examiner—Lois E. Boland
Attorney, Agent, or Firm—Craig and Antonelli

[57] ABSTRACT

Safety tire comprising a tread (11) reinforced by an inextensible belt (23), spaced beads (12), and side walls (14) connecting the beads to the sides of the tread, defining below the latter a central inflatable chamber (15), each side wall at least being reinforced by a carcass (21), and comprising on the inside of the carcass a supporting shaped part or support member (20) of lenticular section, made of an elastomer and extending from the vicinity of the beads (12) to below the edges of the belt, said tire being characterized in that the said shaped supporting parts (20) are constituted by two parts with different flexibility, whereof one ($20_1$) disposed near the inner face of the carcass (21) is of a more flexible elastomer while the other ($20_2$) disposed inside the tire is of less flexible elastomer.

5 Claims, 3 Drawing Figures

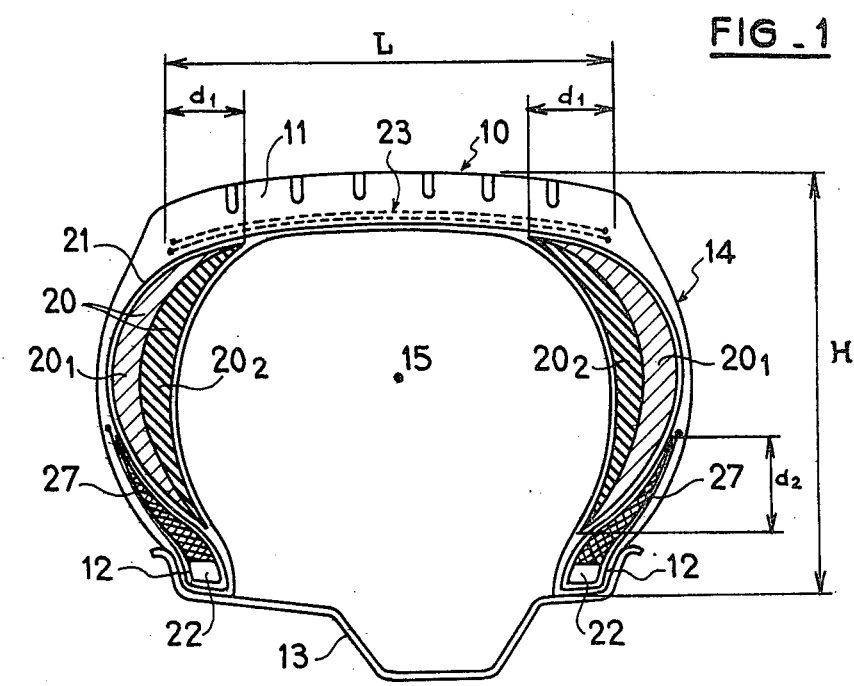
FIG_1
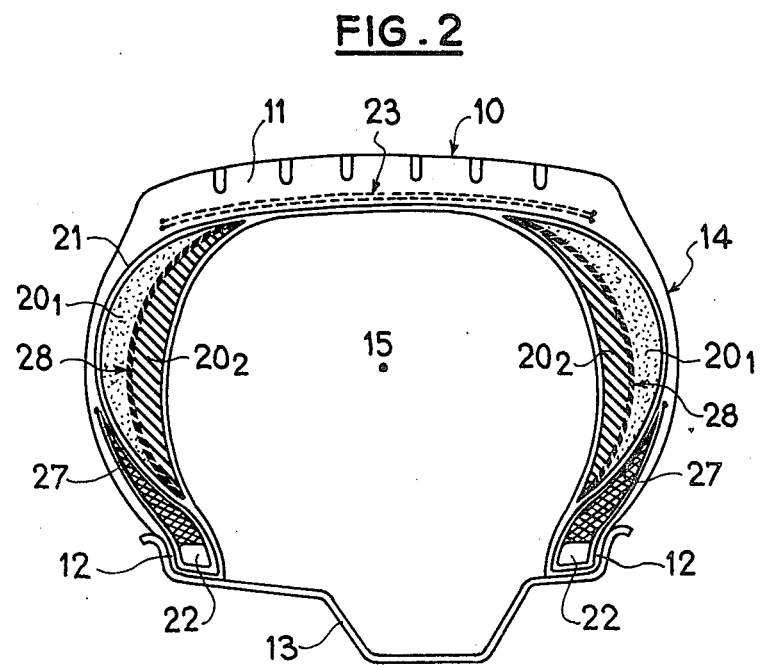
FIG_2

FIG_3
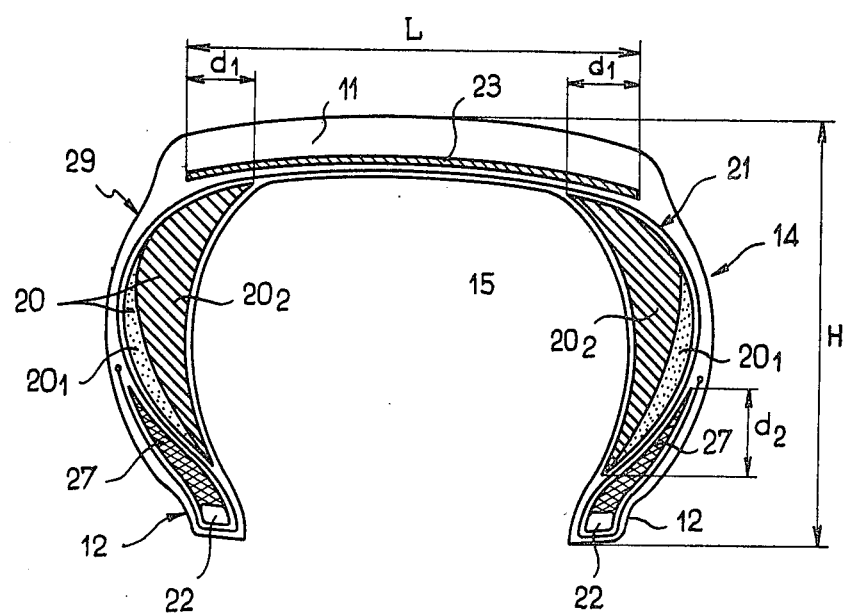

SAFETY TIRE WITH SIDEWALL SUPPORT MEMBERS HAVING TWO PARTS WITH DIFFERENT FLEXIBILITIES

The invention relates to safety tires for the equipment of vehicles, of the type that comprises self-supporting side walls which allow said vehicles to continue to roll normally or almost normally without inflating air pressure (e.g. after a puncture), without complete collapse of said tires under the load.

The invention is directed to the problem of obtaining, with these tires, in addition to satisfactory behavior in case of a puncture, acceptable comfort in normally inflated rolling, ease of mounting on ordinary rims, and a weight that is not excessive.

These objectives are attained with the improvements described below with reference to the attached drawings in which FIGS. 1, 2 and 3 show three examples of embodiment of the invention, in cross section.

The tires in question in general comprise a crown 10 with a tread 11 reinforced by an inextensible belt 23 which has about the same width L as the rolling surface, spaced beads 12 which serve to hold the tire in a mounted position on the rim 13 of the wheel, and side walls 14 bulged toward the outside which join beads 12 to the sides of crown 10, defining a central chamber 15 below the crown which can be inflated by a valve.

The whole is reinforced by a carcass 21, preferably of the radial type, constituted by one or more layers of flexible cord which extend below the belt 23 of the crown, into side walls 14 and into beads 12 where the ends are hooked on wires 22 in the customary way, returning more or less upward in the side walls around the filling shaped parts 27 of each bead.

Each side wall 14 comprises, on the inside of the carcass, a supporting shaped part or support member 20, of lenticular section, extending from the vicinity of corresponding bead 12 to the position below the edges of belt 23, becoming thinner at its two ends. The configuration and disposition of these shaped parts are such that, in their upper part, they extend below the edges of belt 23 along a transverse distance $d_1$ which is preferably not less than 15% of the transverse width L of the said belt. They are also such that, at their lower part, the shaped parts extend vertically against shaped parts 27, for filling and stiffening of the beads along a height $d_2$ which is between 15 to 40% of height H of the tire section.

Each supporting shaped part 20 is constituted by two assembled parts which are of different flexibility. Part $20_1$ which is in contact with the carcass is the more flexible: it is made of an elastomer with a Shore hardness A which is no greater than 70 and a modulus of elasticity which is no greater than 80 bars, whereas the other, $20_2$, on the inside of the tire, is an elastomer with a Shore hardness A between 80 and 95 and a modulus of elasticity between 70 and 100 bars (moduli of elasticity at 100% elongation). Preferably, part $20_1$ of the shaped part adjacent to carcass 21 is of an elastomer of cellular structure with a density of the order of 0.3 to 0.9 kg/dm$^3$, a Shore hardness A of the order of 35 and a modulus of elasticity (original modulus) of the order of 20 bars. The other part $20_2$ of the supporting shaped part is of an elastomer with compact structure having the hardness and modulus of the indicated order and formulated to have as low heating by hysteresis when it is in service as possible.

In the example illustrated in FIG. 1, the two assembled parts of the supporting shaped parts 20 have the same height radially, as well as more or less equal thicknesses at each level of their straight section. The ratios of these thicknesses can vary as a function of the flexibility of the elastomers that are used for these two parts, and as a function of the desired suporting capacity of these shaped parts, e.g. between 2/1 and ½. Preferably these thicknesses are selected in such a way that the neutral line of the flexional moment of inertia of the profiled assembly 20 is in the inner part $20_1$ which is the most flexible, or near the interface of the two parts. In normal service, support parts 20 transmit the stresses resulting from inflation pressure to the side walls of carcass 21 so that the carcass is kept tensioned. If the pressure in central chamber 15 is suppressed, side walls 14 bend still more, subjecting shaped parts 20 to a flexion toward the outside which again has the effect of keeping the carcass tensioned, which allows it to resist rapid fatigue failure. In this movement of flexion of the shaped parts, their compact part $20_2$ works principally in flexion, to exert the supporting effect of crown 10 and to limit the bending of side walls 14, while flexible part $20_1$ of the shaped parts is compressed between part $20_2$ and carcass 21 itself.

The constitution of supporting shaped parts 20 as two assembled parts $20_1$-$20_2$ allows optimizing of the properties of these two parts according to their particular mode of action. Part $20_1$ adjacent to the carcass can thus be made of a more flexible mixture, favorable to comfortable rolling and to ease of mounting the tire on the rim, while inner part $20_2$ can be made of a mixture that is less flexible, to have the bearing property that is desired. The constitution of parts $20_1$ of the shaped parts of cellular material also allows lightening of the tire.

In the example of embodiment of FIG. 2, the tire additionally comprises means suitable for promoting evacuation of the heat produced in the thick part of the supporting shaped parts 20, namely when the tire is functioning in conditions that are more severe than usual, i.e. without pressure in the central chamber or with an overload which causes a very great bending of the side walls 14. These means consist of a heat-conducting sheet or layer 28 embedded in the body of shaped parts 20 and extending at least to the vicinity of beads 12. Preferably the layer extends over the whole height of shaped parts 20, from the upper part of the side walls adjacent to the belt of crown 23 to the vicinity of the beads. This conductive layer is advantageously disposed between the two parts of shaped part 20 that are of different flexibility, so as to be situated approximately in the plane of the neutral fiber of flexion, and so as not to be subject to substantial compression or radial extension. The said layer 28 can be constituted for example by flexible parallel metallic cords extending along the radial planes of the tire.

Complementing or replacing the said conductive layers, and likewise for promoting evacuation of the heat produced in the thick part of supporting shaped parts 20, use may be advantageously be made of a carcass 21 made of flexible, good heat conducting metallic cords which take the heat toward zones of the tire that are relatively less subject to heating in service.

In the example of embodiment shown in FIG. 3, flexible part $20_1$ of shaped parts 20 extends in contact with the internal face of carcass 21 from the vicinity of bead 12 to about the level of shoulder 29 of the tire, i.e., a little above half the height of the side walls, and the said part $20_1$ has its maximum thickness situated a little below the half [height] of the side wall. The less flexible part $20_2$ disposed toward the inside of the tire covers part $20_1$ from the vicinity of bead 12, and it extends beyond the said part $20_1$ to a point below the lateral parts of belt 23 along transverse distance $d_1$. Beyond part $20_1$, part $20_2$ is in contact with the inner face of carcass 21, from shoulder 29 where the said part $20_2$ presents its maximum thickness. In this form of embodiment, flexible part $20_1$ of the supporting shaped parts presents a smaller section, less than half the section of the less flexible part $20_2$, ranging for example between half and a quarter of the section of part $20_2$. This increases the capacity of shaped parts 20 for bearing a load and reduces the collapse of the tire when it is used without air pressure in chamber 15. Moreover, with this form of shaped parts 20, the bending of the side walls under load tends to separate beads 12 more in the axial direction and to apply them more strongly against the rim edges, which reduces the risk of coming off the rim in use without air pressure.

By way of indication, in tests done with tires according to FIG. 1, the collapse of the tire under ordinary load is 18% of height H of the section when the tires are inflated to 1.6 bar, and 31% when the tires are used without pressure in chamber 15. With the tires according to FIG. 3, the subsidence is 16% of the height H when they are inflated at 1.6 bar, and 22% only, when there is no pressure in the chamber. In the normally inflated state, the two types of tires that are compared had behavior that was very comparable, but in the uninflated state, the tires of FIG. 3 go down less, which reduces fatigue of the side walls and improves road behavior.

We claim:

1. A safety tire comprising a tread reinforced by an inextensible belt, spaced beads each having a bead core and bead fillers, side walls for connecting the beads to the sides of the tread and for defining an inflatable central chamber, a carcass extending below the tread and into each side wall having ends that are curved around the bead cores and bead fillers of each bead, support members formed of elastomeric material having a lenticular cross sectional shape extending into each side wall on the inside of the carcass from the vicinity of the beads up to the edges of the inextensible belt for reinforcing the tread, each support member being formed of two parts with different flexibilities, one part being located adjacent to the carcass and having a Shore A hardness not greater than 70 and an elasticity modulus not greater than 80 bars and the other part being made of a less flexible elastomeric material and having a Shore A hardness between 80 and 95 and an elasticity modulus between 70 and 100 bars.

2. A tire according to claim 1, wherein the one part, which is located adjacent to the carcass, is made of an elastomeric material having a cellular structure with a density between 0.3 and 0.9 kg/dm$^3$; whereas the other part is located inwardly of the one part and is made of an elastomeric material with a compact non-cellular structure.

3. A tire according to claim 1, further comprising a heat conducting ply layer made of metal cords, said layer being placed between said two parts having different flexibilities and extending from the portion of the tire immediately below the tread to an area immediately above to the beads.

4. A tire according to claim 1, wherein the one flexible part of the support member has a small cross section less than half of the section of the less flexible other part.

5. A tire according to claim 4, wherein the one flexible part of the support member extends from the vicinity of the bead to about the shoulder of the tire; whereas the less flexible other part extends beyond the one part to below the edges of the inextensible belt in contact with the inside portion of the carcass from the tire shoulder, said other part having a maximum thickness at the tire shoulder.

* * * * *